United States Patent Office 3,126,421
Patented Mar. 24, 1964

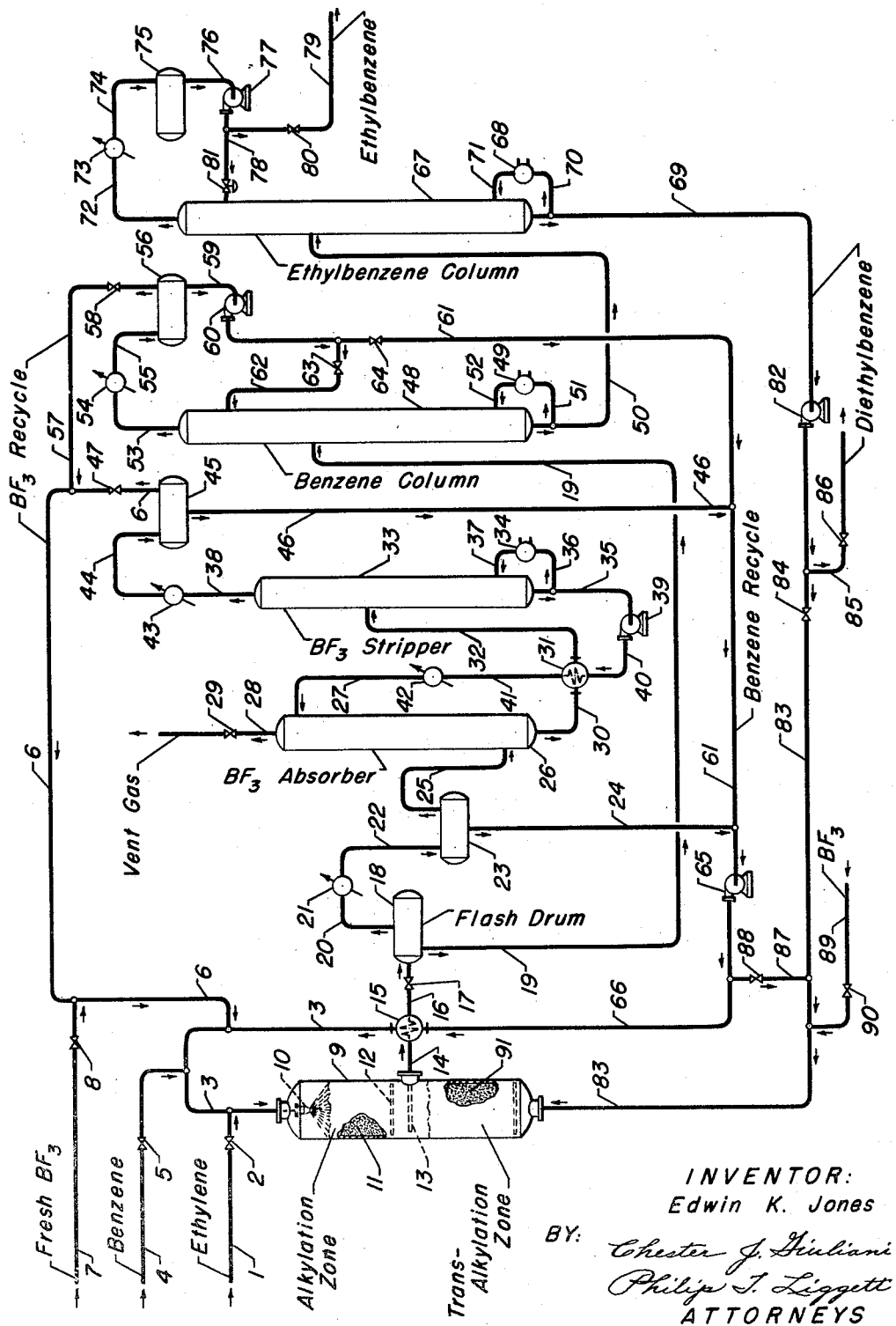

3,126,421
MEANS FOR EFFECTING A COMBINED ALKYLA-
TION-TRANSALKYLATION PROCESS
Edwin K. Jones, Kenilworth, Ill., assignor to Universal
Oil Products Company, Des Plaines, Ill., a corporation
of Delaware
Filed Nov. 21, 1960, Ser. No. 70,654
9 Claims. (Cl. 260—671)

This invention relates to means for effecting a combined alkylation-transalkylation process and more particularly to a combined process for producing a monoalkylated aromatic compound, such as by the alkylation of a benzene hydrocarbon with a gaseous olefin, where the alkylation and transalkylation steps are carried out in a single combined reaction zone and in a manner that provides that the transalkylation step will not be diluted by the presence of the monoalkylated aromatic product stream from the alkylation step.

The usual alkylation system for producing a monoalkylated aromatic product utilizes a single reactor system wherein the resultant streams are mixed with recycled aromatics and polyalkylated aromatics so that the transalkylation step must be effected in the presence of the resulting desired product stream as well as in the presence of unreacted materials.

It is a principal object of the present invention to provide an improved combined system for producing a monoalkylated aromatic wherein the alkylation and transalkylation steps are carried out in substantially unmixed phases.

It is a further object of the invention to provide a unitary reactor arrangement, which in turn provides that a high ratio of aromatic hydrocarbon to the olefin may be maintained internally within the alkylation section of the reactor as compared to the ratio of the aromatic hydrocarbon to the olefin existing outside of the contact zone, or at the point of introduction to the zone.

A still further object of the invention is to effect the contacting of separate beds of alkylation and transalkylation catalyst within the respective alkylation and transalkylation zones of the unit, by having the reactant mixtures introduced separately to the different zones.

The present system is particularly useful for carrying out the alkylation of benzene to produce monoalkylated benzene hydrocarbons. For example, ethylene may be alkylated with benzene to provide ethylbenzene, a desired chemical intermediate which in turn may be utilized in a dehydrogenation process for the manufacture of styrene, a desired starting material for the production of synthetic rubber. Propylene may also be alkylated with benzene for the production of cumene which in turn is useable in large quantities to form cumene hydroperoxide that is readily decomposed into phenol and acetone.

The present process and apparatus arrangement is particularly desirable in that it provides for the recycle of unreacted product and for the transalkylation of polyalkylated aromatic hydrocarbons such that there is a resulting high yield of a desired monoalkylated hydrocarbon. The term "transalkylation" as used herein refers primarily to an equilibrium reaction between an aromatic and a polyalkylated aromatic so as to provide a yield of a desired monoalkylated aromatic hydrocarbon, as, for example, effecting the formation of ethylbenzene from a mixture of benzene and diethylbenzene. In general, it has been found that transalkylation is favored by high aromatic hydrocarbon to alkylating agent ratios. Thus, it is desirable to charge and recycle benzene, so that there is a high molar excess thereof, as compared to the polyalkylated benzene, in the production of monoalkylated benzene compound. The transalkylation reaction is further aided when it is effected without the presence of the monoalkylated aromatic product stream or other compounds formed as side reactions to the alkylation step.

In the present improved system, there is provided a down flow of aromatic hydrocarbon and alkylating agent in a superimposed alkylation zone, while directly below, in a lower contiguous section, there is provided an upflow of aromatic hydrocarbon and polyalkylated aromatic hydrocarbons in a transalkylation zone. This arrangement permits a single withdrawal of product and unreacted materials, together with polyalkylated materials, from an intermediate zone. The contiguous arrangement also provides a tendency for the unreacted aromatic hydrocarbon to become concentrated within the lower portion of the upper alkylation zone, and within the area of product withdrawal. This in turn provides for a desirable high ratio of aromatic hydrocarbon to olefin internally within the lower portion of the alkylation zone, all of which is favorable to higher yields of a desired monoalkylated aromatic compound.

In one embodiment the present invention provides a combined alkylation-transalkylation process for producing a high yield of monoalkylated aromatic compound, in a manner which comprises, passing a mol excess of an aromatic compound together with an alkylating agent to the upper end of a vertically disposed alkylation zone and into contact with an alkylation catalyst maintained therein, passing the mixture downwardly through the catalyst at alkylating conditions to an intermediate portion of the alkylation zone and discharging therefrom a reaction product stream containing a monoalkylated aromatic compound, effecting the separation of unreacted aromatic compounds and polyalkylated aromatic compounds from the resulting monoalkylated aromatic compound, returning at least a portion of the unreacted aromatic compound and the polyalkylated aromatic compounds to the lower end of the alkylation zone and reacting them therein at transalkylation conditions in the presence of a separate portion of alkylation catalyst maintained in such lower portion during an upward flow of the mixture to the intermediate portion of said zone, and discharging a resulting combined reacted product stream of the desired monoalkylated aromatic compound, unreacted aromatic compounds and polyalkylated aromatic compounds from the intermediate portion of said zone for separation as aforesaid.

The desired alkylation process, as well as the transalkylation reaction step, may be carried out advantageously by the use of boron trifluoride and a boron-trifluoride-modified carrier material. The carrier is preferably an inorganic oxide and may be selected from among many inorganic oxides, including: alumina, silica, boria, oxides of phosphorous, titanium dioxide, zirconium dioxide, chromia, zinc oxide, magnesia, calcium oxide, silica-alumina, silica-magnesia, silica-alumina-magnesia, silica-alumina-zirconia, chromia-alumina, alumina-boria, silica-zirconia, etc., and various naturally occurring inorganic oxides of various states of purity such as bauxite, clay (which may or may not have been previously acid treated), diatomaceous earth, etc. Of the above mentioned inorganic oxides, gamma-alumina and theta-alumina are most readily modified by boron trifluoride and thus the use of one or both of these boron trifluoride-modified aluminas is preferred. The modification of the inorganic oxide, particularly alumina, may be carried out prior to or simultaneous with the passage of the reactants containing boron trifluoride to the reactor. Most simply, this modification is accomplished by the mere passage of boron trifluoride gas over a bed of the inorganic oxide maintained at the desired temperature. If the modification of the inorganic oxide with boron trifluoride is carried out during passage of the reactants thereover, the catalyst will exhibit an induction period and thus complete reaction of the alkylating agent with the alkylatable aromatic compound, and transalkylation of the recycled polyalkylated aromatic compounds, will not take place for some hours, say up to twelve or more.

In a more specific embodiment, the present invention provides a combined alkylation-transalkylation process for producing a monoalkylated aromatic compound which comprises, passing a mol excess of an aromatic compound together with an alkylating agent and boron trifluoride to the upper end of a vertically disposed alkylation zone and into contact with a boron trifluoride-modified solid inorganic oxide catalyst, passing the mixture downwardly through the catalyst at alkylating conditions to an intermediate portion of the alkylation zone and discharging therefrom a reaction product stream containing the monoalkylated aromatic compound, effecting the separation of unreacted aromatic compound and polyalkylated aromatic compounds from the resulting monoalkylated aromatic compound, returning at least a portion of the unreacted aromatic compound and the polyalkylated aromatic compounds to the lower end of the alkylation zone and reacting them in the presence of boron trifluoride and a separate portion of boron trifluoride-modified solid inorganic oxide catalyst during an upward flow of the mixture at transalkylating conditions to the intermediate portion of said zone, and discharging therefrom a resulting combined product stream of the desired monoalkylated aromatic compound, unreacted aromatic compound and polyalkylated aromatic compounds for separation as aforesaid.

The alkylating agent, particularly an olefin-acting compound, and still more particularly an olefin hydrocarbon, which is charged to alkylation reaction zone with the aromatic hydrocarbon, may be selected from diverse materials including monoolefins, diolefins, polyolefins, acetylenic hydrocarbons, and also alcohols, ethers, esters, the latter including alkyl halides, alkyl sulfates, alkyl phosphates, and various esters of carboxylic acids. The preferred alkylating agents are olefinic hydrocarbons which comprise monoolefins containing one double bond per molecule and polyolefins which contain more than one double bond per molecule. Monoolefins which are utilized as olefin-acting compounds in the process of the present invention are either normally gaseous or normally liquid and include ethylene, propylene, 1-butene, 2-butene, isobutylene, and higher molecular weight normally liquid olefins such as the various pentenes, hexenes, heptenes, octenes, and mixtures thereof, and still higher molecular weight liquid olefins, the latter including various olefin polymers having from about 9 to about 18 or more carbon atoms per molecule including propylene trimer, propylene tetramer, propylene pentamer, etc. Cycloolefins such as cyclopentene, methylcyclopentene, cyclohexene, methylcyclohexene, etc., may also be utilized. Also included within the scope of the term alkylating agent are certain olefin-acting substances capable of producing olefinic hydrocarbons or intermediates therefor under the conditions of operation utilized in the process. Typical olefin-producing substances or olefin-acting compounds capable of use include alkyl halides capable of undergoing dehydrohalogenation to form olefinic hydrocarbons and thus containing at least two carbon atoms per molecule. Examples of such alkyl halides include ethyl fluoride, n-propyl fluoride, isopropyl fluoride, n-butyl fluoride, isobutyl fluoride, sec-butyl fluoride, tert-butyl fluoride, etc., ethyl chloride, n-propyl chloride, isopropyl chloride, n-butyl chloride, isobutyl chloride, sec-butyl chloride, tert-butyl chloride, etc., ethyl bromide, n-propyl bromide, isopropyl bromide, n-butyl bromide, isobutyl bromide, sec-butyl bromide, tert-butyl bromide, etc. As stated hereinabove, other esters such as alkyl sulfates including ethyl sulfate, propyl sulfate, etc., and alkyl phosphates including ethyl phosphate, etc., may be utilized. Ethers such as diethyl ether, ethyl propyl ether, di-propyl ether, etc., are also included within the generally broad scope of the term alkylating agent and may be successfully utilized as alkylating agents in the process of this invention but not necessarily under the same conditions of operation.

Olefin hydrocarbons, particularly normally gaseous olefin hydrocarbons, are preferred olefin-acting compounds for use in the process of this invention. The normally gaseous olefin hydrocarbons which appear in minor quantities in various refinery gas streams, usually diluted with gases such as hydrogen, nitrogen, methane, ethane, propane, etc., are also desirable alkylating agents within the scope of the present alkylating process. These gas streams containing minor quantities of olefin hydrocarbons are obtained in petroleum refineries from various refinery installations including thermal cracking units, catalytic cracking units, thermal reforming units, coking units, polymerization units, dehydrogenation units, etc.

Many aromatic compounds are utilizable as alkylatable aromatic compounds within the process of this invention. The preferred aromatic compounds are aromatic hydrocarbons, and the preferred aromatic hydrocarbons are monocyclic aromatic hydrocarbons, that is, benzene hydrocarbons. Suitable aromatic hydrocarbons include benzene, toluene, ortho-xylene, meta-xylene, para-xylene, ethylbenzene, ortho-ethyltoluene, meta-ethyltoluene, para-ethyltoluene, 1,2,3-trimethylbenzene, 1,2,4-trimethylbenzene, 1,3,5-trimethylbenzene, normal propylbenzene, isopropylbenzene or cumene, normal-butyl-benzene, etc. Higher molecular weight alkylaromatic hydrocarbons are also suitable as starting materials and include aromatic hydrocarbons such as are produced by the prior alkylation or aromatic hydrocarbons with olefin polymers. Such products are referred to in the art as alkylate and include hexylbenzene, hexyltoluene, nonylbenzene, nonyltoluene, dodecylbenzene, dodecyltoluene, pentadecylbenzene, pentadecyltoluene, etc. Other suitable alkylatable aromatic hydrocarbons include those with two or more aryl groups such as diphenyl, diphenylmethane, triphenylmethane, fluorene, stilbene, etc. Examples of alkylatable aromatic hydrocarbons within the scope of this invention utilizable as starting materials and containing condensed benzene rings include naphthalene, alpha-methylnaphthalene, beta-methylnapththalene, etc., anthracene, phenanthrene, naphthacene, rubrene, etc. Of the alkylatable aromatic hydrocarbons for use as starting materials in the process of this invention, the benzene hydrocarbons are preferred, and of the benzene hydrocarbons, benzene itself is particularly preferred.

The present improved combined system may be more easily understood by reference to the accompanying drawing and the following description thereof.

For purpose of illustration in describing the improved process, it is to be assumed that ethylene is being alkylated with benzene to form ethylbenzene as a monoalkylated benzene hydrocarbon. Ethylene is introduced by way of line 1 and valve 2 into line 3 which is carrying recycled benzene stream together with a fresh charge stream of benzene which may be introduced by way of line 4 and valve 5. Recovered boron trifluoride from line 6, as well as additional fresh boron trifluoride, introduced as may be necessary by way of line 7 and valve 8, also enters line 3 to be admixed with the ethylene and benzene reactants. In accordance with the preferred arrangement, the mixture enters the top portion of a reactor chamber 9 through a spray or distributing head 10, whereby the mixture may be passed uniformly downwardly through a bed of catalyst particles 11. The bed of particles 11 providing in effect an upper alkylation zone in the chamber 9 may be superimposed upon a suitable perforate plate or grid 12, or if desired upon a filler material such as alumina balls or the like. Discharge of alkylated product is effected at the central portion of the chamber 9 by the use of a suitable collecting header 13, which in turn communicates with outlet line or conduit 14.

The alkylation step in the upper alkylation zone is generally effected at adiabatic conditions with the reactant streams being introduced at suitable temperatures and pressures providing the desired high yield of the monoalkylated product. This alkylation reaction in the presence of a catalyst may be effected at a temperature of from about 50° to about 250° C., or higher, and at a pressure of from about atmospheric to 100 atmospheres or more. The pressures generally used in commercial operation will be that which is sufficient to maintain the alkylatable aromatic compound in a substantially liquid phase at the temperature selected, as well as to provide favorable conditions for separation of the desired reaction product from the unreacted materials. In order to obtain high yields of product, it is also preferable to have present from about 2 to about 20 molar proportions of the aromatic compound to a molar proportion of alkylating agent. The hourly liquid space velocity of the liquid through the alkylation zone, as provided by catalyst bed 11, may be varied over a relatively wide range but is generally from about 0.1 to about 20 or more.

The catalyst of bed 11 may comprise any of several types of suitable alkylation catalyst, however, in accordance with a preferred operation a boron trifluoride-modified alumina catalyst, as hereinbefore described, is used. Continuous or intermittent introduction of boron trifluoride from line 6 into line 3 also maintains the activity of the catalyst alkylation reaction to provide optimum yields of product. The boron trifluoride may be introduced in varying amounts but is generally in an amount from about 0.0001 to about 0.8 mol percent of the alkylating agent.

Resulting alkylation product, preferably with about 100% conversion of the ethylene, is discharged through outlet 14 to a heat exchange 15, providing simultaneously a partial cooling of the effluent stream and the heating of the recycled benzene stream passing to line 3. It may be pointed out that monoalkylated aromatic product from the transalkylation step in the lower portion of reactor 9 is also present at the intermediate zone and at outlet header 14, however, the detailed description of such step will be set forth in detail subsequent to the following detailed description of one embodiment of a separation procedure.

The effluent stream from exchanger 15 passes by line 16 and valve 17 to flash drum 18 where there is a sharp reduction in pressure to provide an overhead stream containing boron trifluoride and some uncondensed benzene and ethylbenzene product. Unvaporized benzene, ethylbenzene, and polyalkylated benzene are withdrawn through the lower portion of flash drum 18 by way of line 19, while the overhead stream passes by way of line 20 to a cooler 21 and line 22 that discharges the cooled stream into a separation zone 23. The latter zone provides for the separation of a condensate stream of benzene and ethylbenzene, which may be withdrawn by way of line 24, and an overhead vaporous stream of light hydrocarbons and entrained boron trifluoride which passes by way of line 25 to a boron trifluoride absorption zone within chamber 26. An absorption oil stream is introduced by way of line 27 to the upper portion of chamber 26 to effect the absorption of boron trifluoride carried thereto by the vapor stream from line 25. Unabsorbed vapors may be discharged from the upper end of chamber 26 by way of line 28 and valve 29 while absorption oil and absorbed boron trifluoride are passed from the lower end of chamber 26 by way of line 30, heat exchanger 31 and line 32 to a boron trifluoride stripper chamber 33. In this zone heat is supplied to the lower end thereof by a reboiler 34 that connects by way of lines 35, 36, and 37. Stripped boron trifluoride is discharged overhead from chamber 33 by way of line 38 while the absorption oil which may, for example, comprise benzene and diethylbenzene, passes from line 35 to pump 39 and to line 40 which in turn connects with heat exchanger 31. In the latter, absorption oil passes in heat exchange relationship with the bottoms stream from the absorber 26, as aforesaid. The partially cooled absorption oil from exchanger 31 passes through line 41 to cooler 42, for further cooling, prior to being introduced into the top of the absorber 26 by way of line 27.

The overhead boron trifluoride stream from line 38 is passed to cooler 43 and line 44 connecting with a separation chamber 45. Entrained liquid, comprising primarily benzene, is withdrawn from separator 45 by way of line 46, while gaseous boron trifluoride is discharged through line 6 and valve 47 to provide recycle of boron trifluoride to the inlet end of the alkylation zone in chamber 9.

The product stream withdrawn by way of line 19 from the lower end of flash drum 18 is introduced into a benzene recovery column 48. Heat is supplied to the lower end of column 48 by way of reboiler 49 connecting thereto through lines 50, 51, and 52. Vaporized benzene passes overhead from column 48 by way of line 53 to a cooler 54 which in turn connects by way of line 55 to a separator 56. The latter permits the separation of entrained gaseous boron trifluoride, passing it overhead by way of line 57 and valve 58 to line 6 where it may combine with boron trifluoride previously separated as overhead from the stripper column 33. Condensed liquid from the bottom of separator 56 passes, in part, by way of line 59, pump 60, lines 61 and 62, and valve 63 into the upper end of the benzene column 48 as reflux. That portion of the benzene not passed as reflux to column 48 is carried by way of line 61 through valve 64 to pump 65 which in turn discharges benzene by way of line 66 to heat exchanger 15 and to line 3 as the benzene recycle stream. Benzene recovered from separators 23 and 45 by their respective withdrawal lines 24 and 46 combines with benzene in line 61 to provide the total benzene recycle returning to the alkylation chamber 9.

The ethylbenzene product stream together with polyalkylated benzenes being discharged from the lower end of column 48 by way of line 50 are transferred to an ethylbenzene recovery column 67 so as to effect a separation of the desired ethylbenzene stream. Heat is supplied to the lower end of column 67 by heat exchanger 68 which connects thereto by way of lines 69, 70 and 71. Ethylbenzene passes overhead from column 67 through line 72, cooler 73 and line 74 to a separator 75. Condensed product from separator 75 passes through line 76, pump 77, line 78 and line 79 with valve 80, to storage means or to such other unit that may be using the ethylbenzene product stream. Required reflux passes by way of line 78 and valve 81 to the upper end of column 67 for use in the ethylbenzene separation step. The heavier diethylbenzene, and other polyalkylated benzenes, are discharged from the lower end of column 67 to line 68, pump 82 and to recycle line 83, having valve 84, which in turn carries the material to the lower portion of alkylation chamber 9. When desired, diethylbenzene may be withdrawn as product from line 83 by way of line 85 and valve 86.

In accordance with the present improved system providing a high yield of monoalkylated aromatic, there is carried out a transalkylation step within the lower portion of the chamber 9, the diethylbenzene stream being returned to the reaction chamber to combine with benzene in the presence of boron trifluoride and a boron trifluoride-modified alumina catalyst for a transalkylation conversion providing a greater quantity of ethylbenzene. Recycled benzene may be combined with the diethylbenzene by means of line 87 and control valve 88, such line connecting between recycle lines 66 and 83. Fresh or recycle boron trifluoride may be introduced into the reactant stream within line 83 by way of line 89 and valve 90.

Also in accordance with the improved operation of the present invention, the transalkylation zone is maintained below and in communication with a superimposed alkylation zone within the reactor chamber 9. Thus, the transalkylation catalyst 91 is provided in a bed within the lower portion of the chamber 9, below the collecting header 13, and the reactant streams are introduced into the lower end of the zone such that there is an upward flow through catalyst bed 91 to the intermediate outlet zone of the chamber.

The transalkylation step is necessarily carried out in the unitary chamber 9 at the same pressure as that desired for the alkylation step in the upper portion of the zone, but the temperature may be slightly different and may vary from about 100° to about 300° C. Here, again, a pressure is desirably utilized that maintains the alkylatable aromatic compound and the polyalkylated aromatic compounds in a substantially liquid phase. Also the molar proportion of the aromatic compound is from about 1 to about 10 or more, and up to 20, with respect to the molar proportion of alkyl group in the polyalkylated aromatic hydrocarbon. Thus, in this instance, the molar ratio of benzene to ethylene is in the ratio of from 1 to 20. The hourly liquid space velocity of the liquid passing through the transalkylation section may again be varied over a wide range but is normally from 0.25 to about 20 or more. At the top of the transalkylation zone, as provided by the catalyst bed 91, the resulting product stream of ethylbenzene and unconverted reactant streams combine with the effluent stream passing from the bottom of the alkylation bed 11 such that there is a combined product stream passing from chamber 9 by way of line 14 to pass to the separation equipment in the manner described.

The specific embodiment of the separation process which has been set forth and described provides one desirable method of separation suitable for the production of ethylbenzene, however, various modifications may well be made in the operation and in the types and arrangement of equipment to accomplish the desired result. In other words, it is not intended to limit the present invention to any one particular type of separation procedure and to utilize one particular flow. Operating conditions in a particular conversion process with respect to temperature, pressure, flow rates, etc., at the reaction zones may also be varied to correspond to the type of alkylation step to be effected so as to provide optimum yields of the particular desired monoalkylated hydrocarbon.

A particularly desirable feature of the combined alkylation step of the present invention is obtained, as mentioned briefly hereinbefore, by virtue of the fact that there is a downward flow through the alkylation zone and an upward flow through the transalkylation zone. For example, in a specific illustration, where there is a five to one molar ratio of benzene to ethylene at the inlet of the alkylation zone and at the top of the alkylation bed 11, and a similar five to one molar ratio of benzene to ethyl group being introduced to the lower end of chamber 9 and into transalkylation bed 21 then there is a resulting higher molar ratio of benzene to ethylene within the central portion of chamber 9 and in the lower end of the alkylation bed 11. In other words, in the operation of this process flow, there is a certain amount of unreacted benzene descending through bed 11, together with a high proportion of unreacted benzene in the upper portion of the transalkylation zone such that the proportion of benzene at the collection header 13 and for a portion of the volume of the chamber there above tends to be greater than for any other portion of the chamber 9. The resulting high molar proportion of benzene to ethylene is, of course, desirable to aid in the alkylation step, providing in turn a system which tends to give optimum conversion of the entire ethylene stream to the formation of a monoalkylated product.

It may also be seen, as hereinbefore mentioned, that the present flow system, with reactant streams passing from each end of the chamber to the center thereof, effects the desired reactions separately and in a manner where there is no reaction product from one zone to contaminate the conversion step in the other zone. There is, in addition, a desirable economic feature of the arrangement in that a single unitary chamber may be erected in lieu of two separate chambers, which are required where alkylation and transalkylation steps are carried out in separate zones. Separate zones, of course, do not accomplish the desired feature of providing the desired high internal molar ratio of aromatic to alkylating agent.

I claim as my invention:

1. A process for producing a monoalkylated aromatic compound which comprises introducing to the upper end of a vertically disposed reaction zone an unalkylated aromatic compound and an alkylating agent, the aromatic compound being in molar excess of the alkylating agent, passing the mixture at alkylating conditions downwardly through a bed of alkylation catalyst in the upper portion of said zone to an intermediate portion of the reaction zone, simultaneously introducing to the lower end of the reaction zone unreacted aromatic compound and polyalkylated aromatic compound obtained as hereinafter set forth, passing the mixture upwardly through a second bed of alkylation catalyst in the lower portion of the reaction zone and therein reacting a portion of said unreacted aromatic compound with polyalkylated aromatic compound, discharging the effluent from said second bed into said intermediate portion of the reaction zone to commingle therein with the effluent from the first-mentioned catalyst bed, thereby increasing the molar ratio of unalkylated aromatic compound to alkylating agent in the lower portion of the first-mentioned bed and in said intermediate portion of the reaction zone, removing the commingled effluents from the intermediate portion of said zone and separating therefrom a monoalkylated aromatic compound, unreacted aromatic compound and polyalkylated aromatic compound, introducing thus separated unreacted aromatic compound and polyalkylated aromatic compound to the lower end of the reaction zone as aforesaid, and recovering said monoalkylated aromatic compound.

2. A process for producing a monoalkylated aromatic compound which comprises introducing to the upper end of a vertically disposed reaction zone an unalkylated aromatic compound, an alkylating agent and boron trifluoride, the aromatic compound being in molar excess of the alkylating agent, passing the mixture at alkylating conditions downwardly through a bed of boron trifluoride-modified solid inorganic oxide in the upper portion of said zone to an intermediate portion of the reaction zone, simultaneously introducing to the lower end of the reaction zone unreacted aromatic compound and polyalkylated aromatic compound obtained as hereinafter set forth, passing the mixture with boron trifluoride upwardly through a second bed of boron trifluoride-modified solid inorganic oxide in the lower portion of the reaction zone and therein reacting a portion of said unreacted aromatic compound with polyalkylated aromatic compound, discharging the effluent from said second bed into said intermediate portion of the reaction zone to commingle therein with the effluent from the first-mentioned bed, thereby increasing the molar ratio of unalkylated aromatic compound to alkylating agent in the lower portion of the first-mentioned bed and in said intermediate portion of the reaction zone, removing the commingled effluents from the intermediate portion of said zone and separating therefrom a monoalkylated aromatic compound, unreacted aromatic compound and polyalkylated aromatic compound, introducing thus separated unreacted aromatic compound and polyalkylated aromatic compound to the lower end of the reaction zone as aforesaid, and recovering said monoalkylated aromatic compound.

3. A process for producing a monoalkylated aromatic hydrocarbon which comprises introducing to the upper end of a vertically disposed reaction zone an unalkylated aromatic hydrocarbon, an alkylating agent and boron trifluoride, the aromatic hydrocarbon being in molar excess of the alkylating agent, passing the mixture at alkylating conditions downwardly through a bed of boron trifluoride-modified solid inorganic oxide in the upper portion of said zone to an intermediate portion of the reaction zone, simultaneously introducing to the lower end of the reaction zone unreacted aromatic hydrocarbon and polyalkylated aromatic hydrocarbon obtained as hereinafter set forth, passing the mixture upwardly through a second bed of boron trifluoride-modified solid inorganic oxide in the lower portion of the reaction zone and therein reacting a portion of said unreacted aromatic hydrocarbon with polyalkylated aromatic hydrocarbon, discharging the effluent from said second bed into said intermediate portion of the reaction zone to commingle therein with the effluent from the first-mentioned bed, thereby increasing the molar ratio of unalkylated aromatic hydrocarbon to alkylating agent in the lower portion of the first-mentioned bed and in said intermediate portion of the reaction zone, removing the commingled effluents from the intermediate portion of said zone and separating therefrom a monoalkylated aromatic hydrocarbon, unreacted aromatic hydrocarbon and polyalkylated aromatic hydrocarbon, introducing thus separated unreacted aromatic hydrocarbon and polyalkylated aromatic hydrocarbon to the lower end of the reaction zone as aforesaid, and recovering said monoalkylated aromatic hydrocarbon.

4. A process for producing an monoalkylated benzene hydrocarbon which comprises introducing to the upper end of a vertically disposed reaction zone benzene, an alkylating agent and boron trifluoride, the benzene being in molar excess of the alkylating agent, passing the mixture at alkylating conditions downwardly through a bed of boron trifluoride-modified alumina in the upper portion of said zone to an intermediate portion of the reaction zone, simultaneously introducing to the lower end of the reaction zone unreacted benzene and polyalkylated benzene obtained as hereinafter set forth, passing the mixture with boron trifluoride upwardly through a second bed of boron trifluoride-modified alumina in the lower portion of the reaction zone and therein reacting a portion of said unreacted benzene with polyalkylated benzene, discharging the effluent from said second bed into said intermediate portion of the reaction zone to commingle therein with the effluent from the first-mentioned bed, thereby increasing the molar ratio of benzene to alkylating agent in the lower portion of the first-mentioned bed and in said intermediate portion of the reaction zone, removing the commingled effluents from the intermediate portion of said zone and separating therefrom a monoalkylated benzene, unreacted benzene and polyalkylated benzene, introducing thus separated unreacted benzene and polyalkylated benzene to the lower end of the reaction zone as aforesaid, and recovering said monoalkylated benzene.

5. The process of claim 4 further characterized in that said alkylating agent comprises a normally gaseous olefin.

6. The process of claim 5 further characterized in that said gaseous olefin is ethylene.

7. The process of claim 5 is further characterized in that said gaseous olefin is propylene.

8. The process of claim 5 further characterized in that the alkylation conditions in the upper portion of the reaction zone are at a temperature of from about 50° to about 250° C., a pressure of from about 1 to about 100 atmospheres, and a liquid hourly space velocity of about 0.1 to about 20.

9. The process of claim 5 further characterized in that the reaction conditions in the lower portion of the reaction zone are at a temperature of from about 100° to about 300° C., a pressure of from about 1 to about 100 atmospheres, and a liquid hourly space velocity of from about 0.25 to about 20.

References Cited in the file of this patent

UNITED STATES PATENTS

| | | |
|---|---|---|
| 2,418,534 | Watson | Apr. 8, 1947 |
| 2,501,223 | Johnson | Mar. 21, 1950 |
| 2,768,985 | Schlatter | Oct. 30, 1956 |
| 2,777,007 | Skinner et al. | Jan. 8, 1957 |
| 2,939,890 | Hervert et al. | June 7, 1960 |
| 2,995,611 | Linn et al. | Aug. 8, 1961 |